June 22, 1965 B. G. KEEL 3,191,165

TRANSDUCER POSITIONING APPARATUS

Filed March 16, 1962

INVENTOR

BEAT G. KEEL

BY

Carlsen & Carlsen

ATTORNEYS 3,191,165

TRANSDUCER POSITIONING APPARATUS

Beat G. Keel, St. Paul, Minn., assignor, by mesne assignments, to Data Products Corporation, Culver City, Calif., a corporation of Delaware Filed Mar. 16, 1962, Ser. No. 180,150
7 Claims. (Cl. 340—174.1)

This invention relates generally to the art of dynamically interchanging information between input and output utilization equipment and a moving storage medium. It is more particularly directed to apparatus for positioning information exchanging devices and associated equipment in operative proximity to a moving storage medium.

Numerous applications have arisen for the use of various forms of memory devices in connection with the performance of operations usually associated with computers and the like. The term generally applied to an important part of such systems is a memory device utilized to permanently or temporarily store information which may be in the form of a magnetically recorded binary code, in such a manner that rapid and accurate access is obtainable for recording and reading. Such operations constitute the interchange of information between the input and output utilization equipment and the memory device containing some form of storage medium.

It has been determined that a great deal more information may be stored in a system in which there is relative movement between a storage medium and a means for interchanging information. Examples of such systems are the familiar magnetic tape and magnetic disc devices in which the storage medium is constantly moving and through various means, information is interchanged at appropriate times to insure satisfactory operation of the computer and the like equipment.

In, for instance, a magnetic information interchanging system, the degree of coupling between any transducer, utilized for reading or writing information, and the storage medium determines to a great extent the fidelity or accuracy of the interchange of information. It has been discovered that the relative movement between a mounting device for such transducers and the storage medium provides a thin film of air on the boundary surfaces of the storage medium at the velocity normally used in moving the storage medium. This boundary layer of air may be used to support a transducer mounting device at a predetermined distance from the surface of the storage medium and has been commonly used in prior art devices. Among the problems that have existed with the use of the boundary layer phenomena is the situation that arises upon the use of storage medium velocities above a predetermined value at which point the force exerted upon transducer mounting devices by the boundary layer becomes great enough to tend to maintain the transducer mounting and therefore the transducers at too great a distance from the storage medium to allow for accurate interchange of information. Another problem arises by virtue of the fact that surface imperfections and dynamic unbalance of the storage medium present an ever changing pattern of motion of the transducer mounting which, again, may result in loss of fidelity in information interchange and further may result in physical damage to the medium or the transducer mounting where actual contact due to such transients occurs. When the optimum distance between the transducers and the storage medium is measured in thousandths of an inch, the problems noted above are easily foreseen. In several examples of prior art devices utilized for transducer positioning, a source of air under pressure is applied to a hollow housing into which is inserted a spherical member proportioned to provide a relatively close fit so that the air pressure tends to force the spherical member downwardly toward a moving storage medium. An appropriately shaped transducer mounting member is attached to the spherical member and is forced downwardly toward the storage medium against the upward force exerted by the boundary layer and appropriate mounting arrangements are provided to allow for variations in the surface of the storage medium so that the transducers are maintained at a predetermined average distance from the surface of the recording medium. While these devices have been satisfactorily used in commercial applications, extreme caution must be utilized in maintaining a suitable supply of air under pressure and further to insure that the air under pressure is completely free of all foreign matter which may lodge in the space between the spherical member and the housing. Where such precautions are not observed, sticking has occurred with resultant severe damage to the recording medium.

It should be apparent that the tolerances required in the prior art devices along with the necessity for a continuous clean supply of air will substantially increase the expense of construction and maintenance of such equipment.

As will be more fully explained below, the present invention provides an improved transducer positioning apparatus which eliminates the necessity for a continuous supply of filtered compressible fluid, provides increased efficiency of operation and may be constructed of parts having wide variations in manufacturing tolerance to provide the desired function. It will also become apparent that the response of the transducer mounting itself is materially increased by the elimination of a substantial portion of the mass found in prior art devices.

For an understanding of one application of our invention to a disc file, reference is made to a co-pending application, Serial No. 142,793, filed in the names of Wallace W. Koskie, Donald K. Sampson and Byron D. Smith, entitled, "Transducer," and assigned to the assignee of the present invention.

It is therefore an object of this invention to provide an improved transducer positioning device for use in information exchange systems wherein relative movement between the storage medium and the transducer occurs.

A further object of the invention is to provide a transducer positioning device in which compressible fluid pressure is utilized to position a transducer mounting.

A further object of the invention is to provide a fail-safe transducer positioning apparatus for use in dynamic information interchanging systems.

A still further object of this invention is to provide an improved transducer positioning apparatus for use in a system wherein a transducer is supported above the surface of a storage medium through air pressure supplied by relative movement therebetween.

These and other more detailed and specific objects will be disclosed in the course of the following specification, reference being had to the accompanying drawings, in which—

Figures 1, 2:
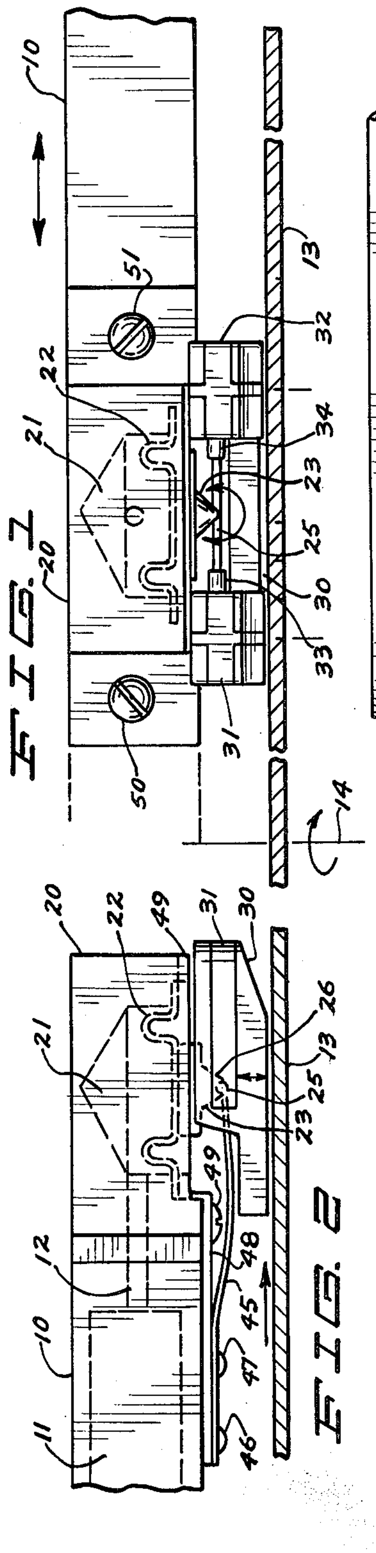
FIG. 1 is a front elevational view of an embodiment of our invention shown in relation to a movable storage medium.
FIG. 2 is a side elevational view of the apparatus in FIG. 1.
Figure 3:
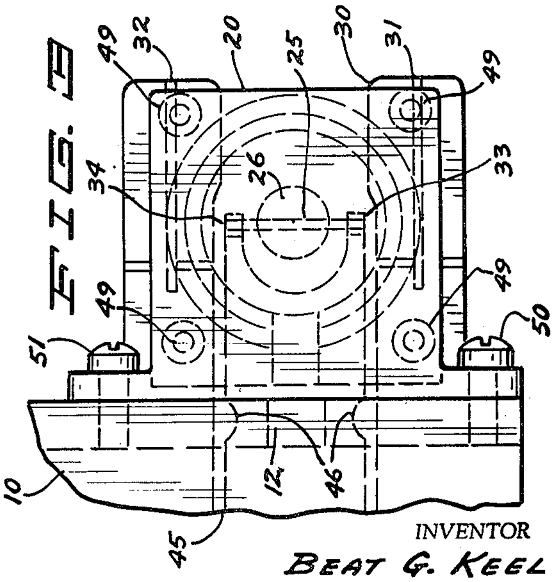
FIG. 3 is a top view of the apparatus shown in FIG. 1.

Referring now to FIGS. 1, 2 and 3 in which like elements are provided with like reference characters, a disc of magnetic storage medium 13 is shown adapted to rotate about an axis 14 at a predetermined constant velocity. A plurality of information storage tracks (not shown) exist radially along storage medium 13. An arm 10 is provided for movement in the directions shown by the arrow applied thereto so as to position a transducer positioning apparatus randomly at predetermined locations with respect to storage medium 13 for interchanging information therebetween. Arm 10, which is shown by way of example only, is positioned radially of disc 13 by suitable equipment (not shown) which is operable to provide accurate reciprocatory positioning of arm 10 in response to signals received from, for instance, a computer for the interchange of information found at predetermined locations on the storage medium 13. It may be apparent that the arm 10 may be one of a pair positioned at opposite sides and in proximity to the top and bottom surfaces of storage member 13. Arm 10 is provided with a duct 11 extending through its length and is utilized for connection to a suitable source of compressible fluid under pressure.

A transducer positioning apparatus or assembly is shown mounted at the end of arm 10 for use in interchanging information between storage medium 13 and input and output utilization devices (not shown). It may be recognized that a plurality of such devices may be mounted along the length of arm 10 so as to reduce the degree of movement necessary for positioning a transducer assembly over the desired track or portion of storage medium 13 which is to be utilized in an interchange operation. Appropriate switching means would be utilized to connect a desired transducer to suitable conductors.

The transducer positioning assembly includes a housing 20 having an aperture or opening 21 which is in fluid communicaton with the interior 11 of arm 10 through an opening 12. Housing 20 may be affixed to arm 10 through suitable fastening means as, for example, screw threaded members 50 and 51 in such a manner as to provide fluid tight communication between the aperture opening 21 and the interior 11 of arm 10. A covering member 22, comprising a resilient diaphragm, shown in the form of a bellofram, and having a bearing assembly member 23 positioned thereon is placed over the outward end of aperture opening 21 and held in fluid tight relationship to housing 20 so as to prevent the escape of the fluid under pressure which may be provided on the interior of housing 20 through interior 11 of arm 10. A transducer mounting member 30, having a lower surface adapted to coact with the boundary layer of fluid existing on the surface of the moving storage medium 13 so as to prevent physical contact, is positioned below the bearing member 23 by a connecting member 45. Connecting member 45, which may be of material suitable to provide a biasing force and having the bowed configuration shown in FIG. 2, is connected at its left hand end to a member 48 by a pair of rivets, or other fastening members, 46 and 47. Member 48 is attached to housing 20 by screw threaded fastening device 49. Biasing and connecting member 45 is bifurcated at its right hand end and includes a pair of pin receiving members 33 and 34 for purposes to be explained below. A pair of semi-circular notches 46 are provided along the length of biasing member 45 and intermediate its ends for purposes to be explained below.

Transducer carrying member 30 is connected to biasing and connecting member 45 by inserting a pin 25 through member 30 and bearing members 33 and 34 on biasing means 45. The force exerted by biasing means 45, being in an upward direction, causes the pin and thereby transducer mounting assembly 30 to engage the end 26 of bearing member 23 to provide a pair of coacting bearing surfaces. It may be noted that the end 26 of bearing member 23 is the apex of a conical section with a small groove running transversely thereof along an axis normal to the direction of relative movement between the transducer positioning assembly and the storage medium 13. Thus, it will be seen that transducer mounting member 30 is movable in an upward and downward reciprocatory motion with respect to housing 20 due to the forces exerted thereon by the boundary air layer between it and storage medium 13 and through the compressible fluid under pressure and the aperture covering member 22. A substantially linear upward and downward motion is achieved by virtue of the bow formed in biasing means and connecting member 45. A transverse rotary motion, as indicated by the circular arrow in FIG. 1, is provided between the coacting bearing surfaces on the end of bearing member 23 and the surface of pin 25 with which it is in contact due to the biasing force exerted therebetween through the action of biasing means 45. A further rotary motion is possible about the axis of pin 25 to allow transducer mounting member 30 to follow small variations in the surface of storage medium 13 in addition to the upward and downward reciprocatory motion hereinabove described.

Figure 4:
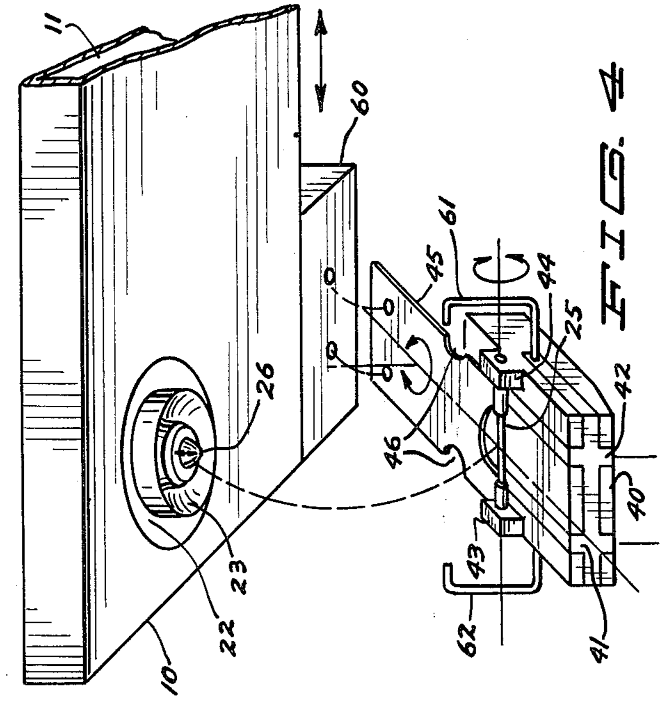
FIG. 4 is a perspective drawing of a further embodiment of my invention.

Another embodiment of my invention is illustrated in FIG. 4 wherein like elements are identified by like reference characters with regard to FIGS. 1, 2 and 3. In FIG. 4, an arm 10, having an interior passage 11 for connection to a suitable source of compressible fluid under pressure, is provided with an aperture which is covered with an extendable flexible member 22 having a bearing 23 attached thereto. The tip of the conical portion of bearing member 23 is provided with a small notch 26 extending transversely thereof for coaction with a pin 25 as in the above noted embodiment. A transducer carrying member 40 having a pair of transducer assemblies 41 and 42 securely mounted therein is connected to a mounting member 60 which is securely affixed to arm 10. A suitable fastening means may be screw threaded fastener or rivets. The spring biasing means and connector means 45 is also provided with a pair of notches 46 positioned intermediate the ends to increase the compliance of the member 45 about its longitudinal axis. As above, a bifurcated end portion having a pair of bearings for coaction with a pin for connection to the transducer mounting member are provided. Pin 25 extends through the pair of bearings on biasing means 45 and portions 43 and 44 on transducer mounting member 40. A pair of cables 61 and 62 are shown and are provided for use in connecting the transducer assemblies 41 and 42 respectively to the input and output utilization apparatus.

In normal operation, the storage medium 13 is driven at a predetermined velocity of movement which is substantially constant before the application of compressible fluid under pressure, such as air, or nitrogen, to the interior 11 of arm 10 and then to the covering member 22 over the aperture provided therein. A force is exerted through bearing member 23 upon pin 25 against the upward force exerted by biasing means 45 to extend the transducer mounting member into proximity with the moving storage medium and information exchanging position. The application of the fluid under pressure provides a force tending to overcome the lifting force of the boundary layer on the surface of the storage medium to tend to position the transducer mounting member at a predetermined optimum distance from the surface of storage medium so as to provide sufficient coupling to insure accurate and reliable interchange of information. It may be seen that the fluid under pressure acts as a spring with a substantially zero spring rate and allows the transducer carrying member to conform quite readily to variations in the surface of the storage medium. As these variations may occur both laterally and longitudinally of the transducer mounting member it is seen that the freedom of attitude of the head, or transducer mounting member, is such as to allow conformity to such variations while maintaining the predetermined optimum distance between the head and the storage medium for satisfactory interchange of information.

In actual operation of an embodiment of my invention, it was discovered that a source of fluid under pressure within the range of five to ten p.s.i. was satisfactory for adequate operation of the transducer positioning assembly and that variations in the pressure had substantially no effect on the quality of interchange of information. It may also be noted that the present invention provides a considerable reduction in the mass of the transducer mounting members 30 and 40 which is conducive to increased dynamic performance in response to transient imperfections in the surface of the storage medium.

It may also be realized by one skilled in the art that the number of elements of which the transducer positioning device is comprised which require precision tolerances and manufacturing operations is extremely small. It may therefore be constructed in an economical manner using techniques which do not require expensive precision operation. For example, plastic injection molding and die stamping and forming and straight forward assembly techniques may be utilized to provide a device having increased performance over those available for performing the same function.

It may also be noted that the absence of close tolerance connections between parts removes the prior requirement for a clean source of fluid under pressure. Further, the fail safe feature of retraction of the transducer mounting member upon failure of the source of compressible fluid under pressure is greatly enhanced by the absence of any close tolerance sliding members.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a system for interchanging information with a moving storage medium, transducer positioning apparatus comprising; a hollow housing adapted for connection to a source of compressible fluid and including an aperture; an extendable member in said aperture, said member including a bearing surface shaped substantially as the conical apex of a cone and extending from the remaining surface of said member; a transducer mounting member including a bearing surface adapted to rotatably cooperate with the conical apex on said extendable member; and means operatively associated with said housing and said transducer mounting member, said means tending to bias said transducer mounting member toward said extendable member and to maintain said transducer mounting member in predetermined relationship with one axis of said housing.

2. In a system for interchanging information with a moving storage medium, transducer positioning apparatus comprising; a hollow housing adapted for connection to a source of compressible fluid and including an aperture; an extendable member in said aperture, said member including a conical bearing surface extending from the remaining surface of said member and having a laterally extending notch therein; a transducer mounting member including a bearing surface adapted to cooperate with the laterally extending notch in the bearing surface on said extendable member; and means operatively associated with said housing and said transducer mounting member, said means tending to bias said transducer mounting member toward said extendable member and to maintain said transducer mounting member in predetermined relationship with one axis of said housing.

3. In an information exchanging system for random access to storage tracks on a moving storage medium, transducer positioning apparatus, comprising;

(1) a hollow adapted for connection to a source of compressible fluid under pressure, said housing including an aperture extending parallel to the surface of a moving storage medium;

(2) a diaphragm covering said aperture and movable in response to variations in fluid pressure within said housing;

(3) a conical bearing member mounted on said diaphragm and extending outwardly from said housing; said conical bearing member having a lateral groove extending therethrough;

(4) a transducer mounting member including rod means positioned within said groove to be pivotably engageable with said bearing member for positioning said mounting member in accordance with the position of said diaphragm; and (5) biasing means connected to said housing for tending to position said mounting means in engagement with said bearing member.

4. The apparatus of claim 3 in which the means biasing the transducer mounting member provides rectilinear movement thereof along an axis normal to the plane of the aperture.

5. The apparatus of claim 3 in which the means biasing the transducer mounting member is formed of an arcuately shaped strip of resilient material.

6. The apparatus of claim 5 in which the strip of resilient material is provided with a pair of notches intermediate the end portions.

7. The apparatus of claim 5 in which the strip of resilient material is bifurcated at the end associated with the transducer mounting member.

References Cited by the Examiner

UNITED STATES PATENTS

| | | | |
|---|---|---|---|
| 2,315,758 | 4/43 | Willits | 137—795 |
| 2,862,781 | 12/58 | Baumeister | 179—100.2 |
| 2,886,651 | 5/59 | Vogel | 179—100.2 |
| 2,928,709 | 3/60 | Baumeister | 340—174.1 |
| 2,937,240 | 5/60 | Harker | 340—174.1 |
| 2,950,104 | 8/60 | Bowser et al. | 267—65 |
| 3,037,793 | 6/62 | Gouirand | 267—65 |
| 3,041,612 | 6/62 | Woodcock | 179—100.2 |
| 3,056,962 | 10/62 | Johnson et al. | 179—100.2 |
| 3,065,460 | 11/62 | Altenau et al. | 179—100.2 |
| 3,123,677 | 3/64 | Lauxen et al. | 179—100.2 |
| 3,124,660 | 3/64 | Criner | 179—100.2 |

FOREIGN PATENTS

| | | |
|---|---|---|
| 1,020,803 | 12/57 | Germany. |
| 1,258,021 | 6/59 | France. |

OTHER REFERENCES

Streeter, IBM Technical Disclosure Bulletin, Compound Air Head, vol. 3, No. 8, January 1961, pages 4 and 5.

IRVING L. SRAGOW, *Primary Examiner.*